(12) United States Patent
Jo et al.

(10) Patent No.: US 8,928,930 B2
(45) Date of Patent: Jan. 6, 2015

(54) IMAGE FORMING APPARATUS AND METHOD OF PRINTING REDUCTION IMAGE THEREOF

(75) Inventors: Yong-sung Jo, Seoul (KR); Young-taek Cho, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 661 days.

(21) Appl. No.: 13/193,046

(22) Filed: Jul. 28, 2011

(65) Prior Publication Data

US 2012/0044507 A1 Feb. 23, 2012

(30) Foreign Application Priority Data

Aug. 23, 2010 (KR) .................. 10-2010-0081476

(51) Int. Cl.
| | |
|---|---|
| G06K 15/02 | (2006.01) |
| G06F 3/12 | (2006.01) |
| H04N 1/393 | (2006.01) |
| G06T 3/40 | (2006.01) |
| G06T 11/20 | (2006.01) |
| H04N 1/32 | (2006.01) |

(52) U.S. Cl.
CPC .............. *H04N 1/3935* (2013.01); *G06T 3/40* (2013.01); *G06T 11/203* (2013.01); *H04N 1/32128* (2013.01); *H04N 2201/0082* (2013.01); *H04N 2201/3242* (2013.01); *H04N 2201/3278* (2013.01)
USPC ........................................... 358/1.2; 358/1.1

(58) Field of Classification Search
None
See application file for complete search history.

(56) References Cited

U.S. PATENT DOCUMENTS

| | | | | |
|---|---|---|---|---|
| 4,219,822 A | * | 8/1980 | Paranjpe | 347/42 |
| 5,299,292 A | * | 3/1994 | Kadowaki et al. | 358/1.8 |
| 6,301,013 B1 | * | 10/2001 | Momose et al. | 358/1.15 |
| 6,614,546 B1 | * | 9/2003 | Kurozasa | 358/1.15 |
| 6,863,367 B2 | * | 3/2005 | Hamamoto et al. | 347/23 |
| 7,040,821 B2 | * | 5/2006 | Yamanaka | 400/76 |
| 7,385,725 B1 | * | 6/2008 | Sawyer | 358/1.18 |
| 7,570,402 B2 | * | 8/2009 | Yoshida | 358/521 |
| 7,869,094 B2 | * | 1/2011 | Saquib | 358/3.13 |
| 8,059,290 B2 | * | 11/2011 | Kuroshima | 358/1.15 |
| 8,134,723 B2 | * | 3/2012 | Shimizu | 358/1.14 |
| 2002/0196302 A1 | * | 12/2002 | Saruta | 347/19 |
| 2003/0160977 A1 | * | 8/2003 | Nishikawa et al. | 358/1.2 |
| 2005/0206937 A1 | | 9/2005 | Hirabayashi | |

(Continued)

FOREIGN PATENT DOCUMENTS

| | | |
|---|---|---|
| EP | 0 401 058 | 12/1990 |
| EP | 0 854 632 A2 | 7/1998 |
| JP | 2008243235 | 10/2008 |

OTHER PUBLICATIONS

EP Search Report issued in EP application No. 11176460.1 dated Aug. 21, 2012.

(Continued)

*Primary Examiner* — Marcus T Riley
(74) *Attorney, Agent, or Firm* — Staas & Halsey, LLP (57) ABSTRACT

A method reducing an image size of an image printed by an image forming apparatus includes determining whether a line width of an unprintable line will be compensated when it is determined that there is the unprintable line, rendering an object based on image data in which a result of determining whether the line width will be compensated is reflected, and performing a reduction printing operation of the object based on the rendering result.

21 Claims, 10 Drawing Sheets

(56) References Cited

U.S. PATENT DOCUMENTS

2007/0052979 A1    3/2007  Burlingame
2007/0121130 A1*   5/2007  Yoshida .......................... 358/1.9
2012/0044507 A1*   2/2012  Jo et al. .......................... 358/1.2
2012/0105873 A1    5/2012  Tomomatsu

OTHER PUBLICATIONS

Method To Improve the Quality of Printed Thin Lines, Research Disclosure, Mason Publications, Hampshire, GG, vol. 491, No. 55, Mar. 1, 2005, XP007134862.

* cited by examiner

IMAGE FORMING APPARATUS AND METHOD OF PRINTING REDUCTION IMAGE THEREOF

CROSS-REFERENCE TO RELATED APPLICATIONS

This application claims the benefit of priority under 35 U.S.C. §119 to Korean Patent Application No. 10-2010-0081476, filed on Aug. 23, 2010, in the Korean Intellectual Property Office, the disclosure of which is incorporated herein in its entirety by reference.

BACKGROUND OF THE INVENTION

1. Field of the Invention

The present general inventive concept relates to an image forming apparatus and a method of printing a reduction image after compensating for a line thickness of the reduction image.

2. Description of the Related Art

If a user performs a reduction printing operation by using an image forming apparatus such as a printer, a predetermined reduction ratio is set through a reduction print option in a printer driver installed in a host device. When the image forming apparatus receives image data, in which the reduction print option is set, the image forming apparatus performs the reduction printing operation by printing objects included in the image data after adjusting sizes of the objects by the predetermined ratio. That is, the sizes of the objects are reduced by the predetermined ratio according to the reduction print option. Here, the objects are included in the image data to be printed on a printing medium, and may include images and characters. When the reduction printing operation is performed, lines that are too narrow to be printed in the reduced objects are not printed, and thus, some parts of the objects may not be shown in the printed image. Therefore, when some parts of the objects are not printed on the printing medium, the user may not recognized the printed image, and thereby printing quality is degraded.

SUMMARY OF THE INVENTION

The present general inventive concept provides an image forming apparatus and a method of printing reduced images in the image forming apparatus.

Additional aspects and advantages of the present general inventive concept will be set forth in part in the description which follows and, in part, will be obvious from the description, or may be learned by practice of the general inventive concept.

Features of the present general inventive concept may be realized by a method of performing reduction printing in an image forming apparatus, the method including receiving image data in which a reduction print option is set from a host device connected to the image forming apparatus, determining whether there is at least one unprintable line due to the reduction print option based on line widths of lines forming at least one object included in the image data, when it is determined that there is an unprintable line, determining whether a line width of the unprintable line will be compensated, rendering the object based on the image data in which a result of the determining of whether the line width of the unprintable line will be compensated is reflected, and performing a reduction printing operation by printing the object based on a rendering result.

Features of the present general inventive concept may also be realized by a computer readable recording medium having embodied thereon a computer program to execute the method.

Features of the present general inventive concept may also be realized by an image forming apparatus including a network interface unit to receive from host device image data in which a reduction print option is set, a line determiner to determine whether there is at least one unprintable line due to the reduction print option based on line widths of lines forming at least one object included in the image data, a compensation determiner to determine whether a line width of the unprintable line will be compensated, a rendering unit to render the object based on the image data in which a result of the compensation determiner is reflected, and a printing unit to perform a reduction printing by printing the object based on a rendering result.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
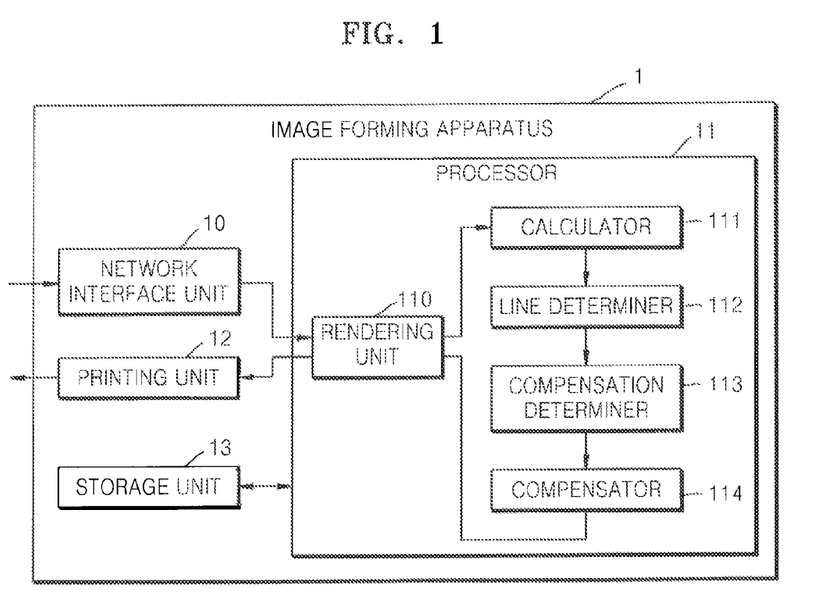
FIG. 1 is a block diagram of an image forming apparatus according to an embodiment of the present general inventive concept.

FIG. 1 is a block diagram of an image forming apparatus 1 according to an embodiment of the present general inventive concept. Referring to FIG. 1, the image forming apparatus 1 includes a network interface unit 10, a processor 11, a printing unit 12, and a storage unit 13. The processor 11 includes a rendering unit 110, a calculator 111, a line determiner 112, a compensation determiner 113, and a compensator 114. The processor 11 may be realized as an array of a plurality of logic gates, or as a combination of a universal microprocessor and a memory storing a program executed in the microprocessor. In addition, one of ordinary skill in the art would recognize that the processor 11 may be realized as another kind of hardware. In the present specification, only hardware components relating to the present embodiment will be described. However, one of ordinary skill in the art would recognize that other universal hardware components besides the hardware components shown in FIG. 1 may be included in the image forming apparatus 1.

The image forming apparatus 1 is an apparatus that is connected to a host device (not shown) to print visible images onto a printing medium according to digital image signals input from the host device, and may include a printer, a scanner, or a combined machine. The host device may be an apparatus such as a personal computer (PC) or a notebook computer that may be connected to the image forming apparatus 1, and includes a printer driver for performing the printing operation in the image forming apparatus 1.

A user may set various options for performing the printing operation in the image forming apparatus 1 by using the printer driver driven in the host device. Among those options, there is a reduction print operation for performing a reduction printing operation in the image forming apparatus 1. The reduction print option may include, for example, an N-up option that sets the number (N, N is a natural number) of pages that will be reduced and printed on one sheet of a printing medium. In addition, the reduction print option may include an option setting that sets one page to be printed on one sheet of a printing medium at a predetermined reduction ratio, for example, an option for reducing A4-size images into A-6 size images. In other words, the reduction printing operation is an operation in which an image, which has a predetermined "normal" size as displayed on a screen or stored in memory, is reduced to be printed. The normal size varies, but may include a sheet size (such as A4 or A6 for a document), an image size determined by a resolution of the image, or any other predetermined size.

The network interface unit 10 receives image data, in which the reduction print option is set, from the host device. As described above, the reduction print option is set by the printer driver driven in the host device.

Image data received by the image forming apparatus 1 includes information about lines, color, and shapes forming at least one object to be printed, and coordinates representing a location of the object. If the object is a character, the image data includes information about the font of the character. In addition, the image data includes information about the reduction print option set by the printer driver. The information included in the image data received by the image forming apparatus 1 is well known in the art, and thus, detailed descriptions about the information are not provided here.

If an object corresponds to a diagram or a figure, the object printed by the image forming apparatus 1 onto a printing medium may appear to a viewer to have contiguous regions, even though the object is formed as a set of dots. Each dot is a point that is printable by the image forming apparatus 1, such as by ejecting ink or applying toner to a point on the printing medium. If the image forming apparatus 1 prints the object, the object is printed line by line in a direction opposite to a direction in which a printing medium is inserted, and thus, the object may be considered to include a plurality of lines. Here, each line includes a plurality of dots arranged in a row.

In general, a minimum line width that is printable on a printing medium is set in the image forming apparatus 1. For example, the image forming apparatus 1 may print a line having a line width that is equal to or greater than 1 dot, and a line having a line width less than 1 dot may not be printed by the image forming apparatus 1. Therefore, among lines forming an object, lines having a line width less than 1 dot may not be printed by the image forming apparatus 1, even if the lines having a line width less than 1 dot may be displayed on the host device. For example, the host device may include a screen that displays the object to be printed, and the screen may have a resolution greater than the printing resolution of the image forming apparatus 1. Therefore, the image forming apparatus 1 may not print an image desired by the user as it is, due to lines that are not printable, such as lines that appear in the image displayed on the screen, but do not appear in a printed image. Hereinafter, it is assumed that the minimum line width that can be printed by the image forming apparatus 1 is 1 dot; however, the present inventive concept is not limited thereto.

In particular, the above phenomenon becomes severe when the reduction print option is set by the printer driver in the host device. Even if an original image has a line width that is printable by the image forming apparatus 1, the line width is reduced in proportion to the reduction ratio set in the reduction print option. For example, as described above, when the minimum line width that may be printable by the image forming apparatus 1 is 1 dot, a line width of a line forming an object in the original image may be reduced to less than 1 dot, for example, 0.8 dot, according to the reduction ratio. Therefore, a line having a line width less than 1 dot is not printed by the image forming apparatus 1, and thus, quality of the original image may not be obtained from the reduction printing operation.

In the conventional art, in order to prevent lines from disappearing in the reduction printing operation, an application executed in the host device adjusts a resolution of image data according to the reduction ratio, and transfers the image data, the resolution of which is adjusted, to be printed.

However, the above application is executed in the host device and is not operated in the image forming apparatus, and the application may not be used in the image forming apparatus. In addition, if a resolution calculated according to the reduction ratio is not supported by the application, the application may not operate. For example, when N is set as 2 in the N-up option, each page should be reduced to 60-70% of its original size, and the application should support a resolution of about 360 dpi to 420 dpi in order to print the reduced image without lines disappearing in the application supporting a resolution of 600 dpi. However, if the application does not support the above resolution, image data, a resolution of which is adjusted, may not be generated.

Unlike the above conventional art in which an application operates in a printer driver of a host device, in an embodiment of the present general inventive concept, an application to adjust printed line widths operates in the image forming apparatus 1. That is, according to the present embodiment, the image forming apparatus 1 compensates for a line width of a line after receiving image data from the host device in order to prevent the line from disappearing in the reduction printing operation.

The processor 11 includes the rendering unit 110, the calculator 111, the line determiner 112, the compensation determiner 113, and the compensator 114, as described above. The processor 11 compensates for a line width that may not be printable by the image forming apparatus 1 due to the reduction print option, and thus, lines are prevented from disappearing during the reduction printing operation. Hereinafter, operations of the components in the processor 11 will be described.

The rendering unit 110 performs a rendering operation of an image to be printed based on image data transmitted from the host device. That is, the rendering unit 110 performs the rendering operation in consideration of a location of at least one object included in the image data, a shape of the object to be printed, relations between the objects, and the reduction ratio according to the reduction print option. The rendering operation based on the image data transmitted to the image forming apparatus 1 is well known in the art, and thus, detailed descriptions are not provided here.

The calculator 111 calculates a line width of a line that will be printed after being reduced according to the reduction ratio set in the reduction print option. As described above, an object included in image data may include at least one line. The calculator 111 calculates the reduced line width of the at least one line of the object included in the image data according to the reduction ratio.

For example, when lines forming an object respectively have line widths of 1 dot, 2 dots, and 3 dots and the reduction ratio is 50%, the calculator 111 calculates reduced line widths as being 0.5 dot, 1 dot, and 1.5 dots. Furthermore, the calculator 111 performs a rounding up operation or a rounding off operation on the calculated line widths to make the line widths natural numbers, since the image forming apparatus 1 may only perform the printing operation using a natural number of dot units.

Here, a line having a line width of 1 dot in an original object is reduced to having a line width of 0.5 dot when the object is reduced by the reduction ratio of 50%, and then is calculated as having a line width of 0 dots after rounding down the line width of 0.5 dot. Thus, the image forming apparatus 1 may not print the line having the line width of 0.5 dot.

Figure 2:
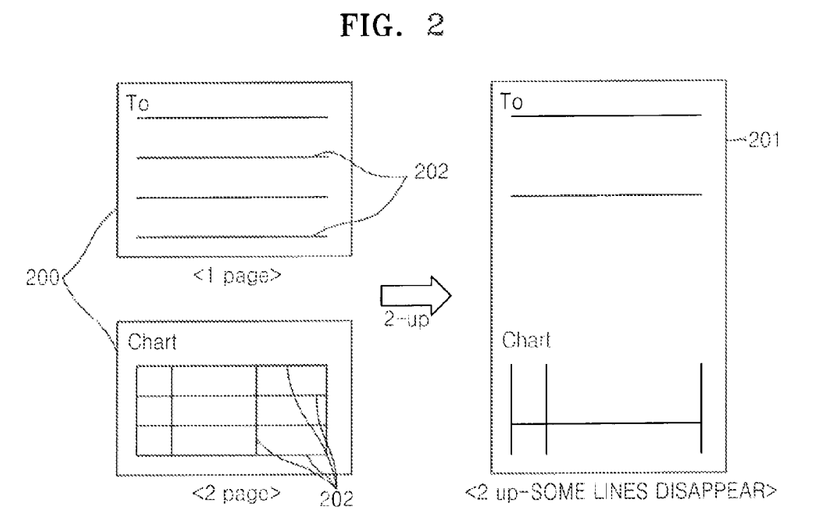
FIG. 2 is a diagram showing a phenomenon in which lines are removed during performing of a reduction printing in a conventional image forming apparatus.

FIG. 2 shows a case where lines disappear when the reduction printing operation is performed in the conventional image forming apparatus. Referring to FIG. 2, original images 200 of two pages are reduction printed as an image 201 of one page according to a 2-up option. Lines 202 forming objects in the original images 200 exist in the original images 200; however, the lines 202 disappear in the reduction-printed image 201. The lines 202 have line widths of 1 dot in the original images 200 as described above, and have line widths reduced to 0.5 dot in the image 201, which may not be printable by the image forming apparatus.

However, according to the present embodiment, lines having a line width of 0.5 dot may be compensated through following processes, and thus, the image forming apparatus 1 may perform the printing operation without the lines disappearing.

Referring to FIG. 1, the line determiner 112 determines whether there is at least one line that is not printed due to the reduction print option based on line widths of lines forming at least one object included in transmitted image data. Here, line widths calculated by the calculator 111 are to be used as a basis for the determination. In more detail, the line determiner 112 determines that there is a line that is not printable when a line width calculated by the calculator 111 is less than a threshold value. In other words, as defined in the present specification and claims, a line that is not printable, or an unprintable line, is a line of image data or print data received from a host apparatus that has a size less than a threshold size, and the threshold size is a minimum size at which the image forming apparatus 1 generates distinct dots or groups of dots. Here, the threshold value may be set as the minimum line width that is printable by the image forming apparatus 1, that is, 1 dot. The line determiner 112 transfers information about a line having a line width less than 1 dot, as calculated according to the reduction print option, to the compensation determiner 113 in order to determine whether the line having the line width less than 1 dot will be compensated for.

The compensation determiner 113 determines whether a line width of a line that is not printable will be compensated for when it is determined that there is an unprintable line. The compensation determiner 113 determines that a line having a line width less than 1 dot is compensated according to the present embodiment. Other embodiments of the compensation determiner 113 will be described later.

When it is determined that a line width of an unprintable line is compensated for, the compensator 114 compensates for the line width of the unprintable line with a printable value. Here, the printable value of the image forming apparatus 1 may be 1 dot.

The compensator 114 changes information about lines that are compensated in received information about image data. That is, the compensator 114 changes a line width of a line that is compensated for into a compensated value in the information about the lines of the image data. The image data changed by the compensator 114 is transferred to the rendering unit 110.

The rendering unit 110 performs a rendering operation of an object based on image data, in which a result of determination for compensation of a line width is reflected. That is, the rendering unit 110 performs the rendering operation based on image data that is changed to include information about lines that are compensated for by the compensator 114.

The printing unit 12 performs a reduction printing operation by printing an object according to a rendering result. The printing unit 12 performs the reduction printing operation by printing the object onto a printing medium through processes such as a charging process, a writing process, a developing process, a transferring process, and a fusing process. The printing unit 12 is a device for performing the reduction printing operation by using a charging roller, a developing roller, a transfer roller, and a fusing roller of the image forming apparatus 1, which is well known to the art, and thus, descriptions are not provided here.

Figure 3:
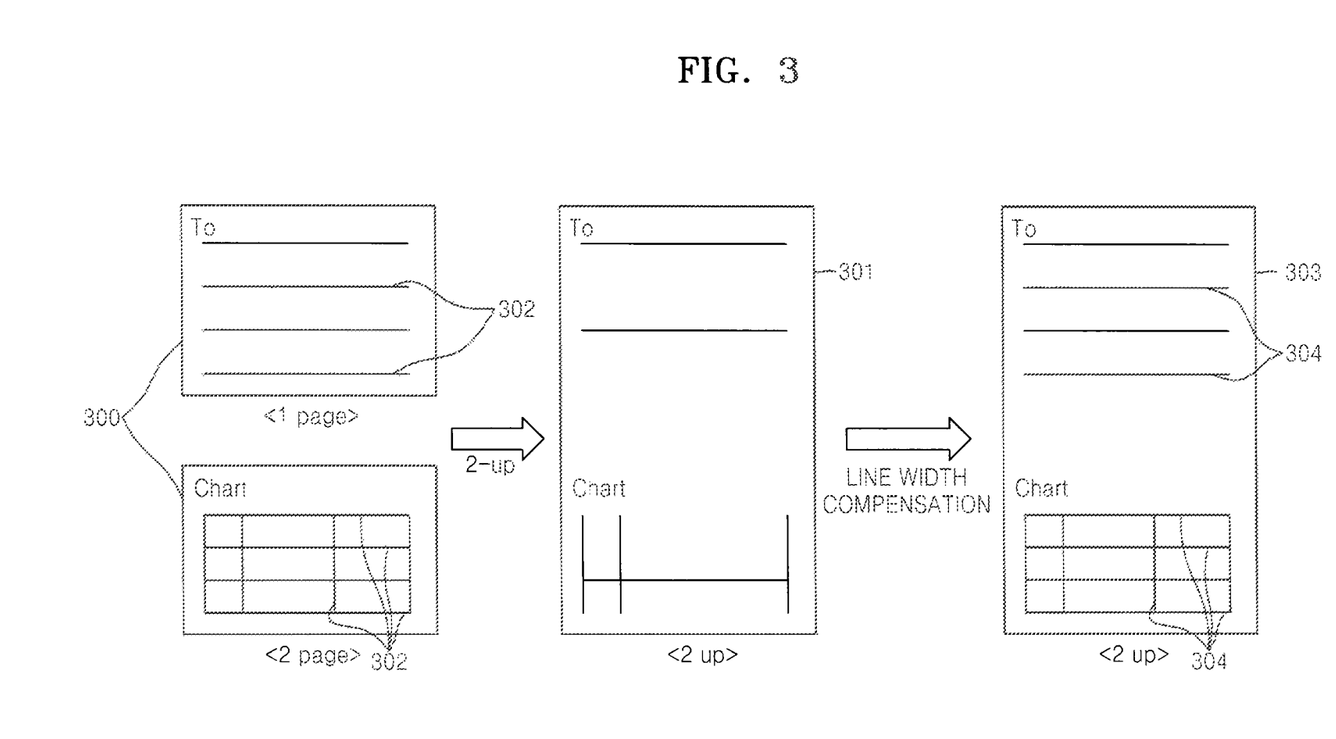
FIG. 3 is a diagram showing a reduction printing result after compensating for a line thickness in an image forming apparatus, according to an embodiment of the present general inventive concept.

FIG. 3 is a diagram showing a reduction printing result after compensating for a line width in the image forming apparatus 1, according to the present embodiment. FIG. 3 shows original images 300 of two pages, an image 301 of one page after performing the reduction printing operation without any compensation for a line width, and an image 303 of one page that is reduction-printed after compensating for a line width, according to a 2-up option.

Lines 302 in the original images 300 are reduced to have line widths less than 1 dot according to the reduction print option. When the lines 302 are printed according to the reduction print operation without compensating for the line widths like in the conventional art, the image forming apparatus 1 may not print the lines 302, and thus, the image 301 does not show the lines 302 that are reduced. However, when the line widths of the lines 302 are compensated to be 1 dot according to the present embodiment, the image 303 shows reduced lines 304.

That is, according to the present embodiment, the original image may be reduced as it is. In addition, since the image forming apparatus 1, and not the host device, performs compensation of line widths disappearance of reduced lines may be prevented when the image forming apparatus 1 is connected to any kind of host device.

Referring to FIG. 1 again, the storage unit 13 stores image data transmitted from the network interface unit 10 and a processing result of the processor 11. In addition, data stored in the storage unit 13 may be read if internal devices of the image forming apparatus 1 require the data.

Hereinafter, another example of the method of determining whether a line width will be compensated in the compensation determiner 113 will be described.

Figure 4A:
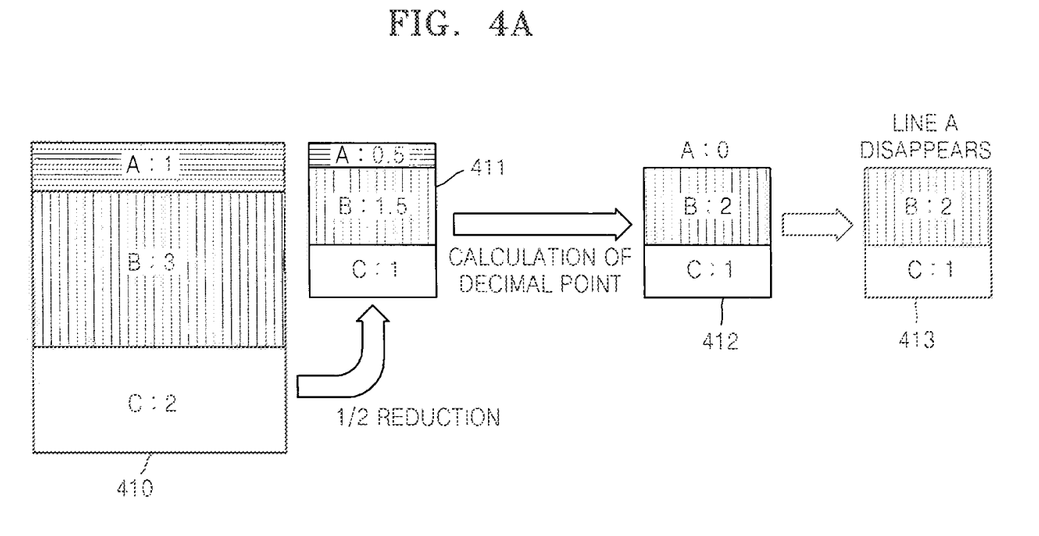
FIG. 4A is a diagram showing a case where lines are printed without compensating for a line thickness.

FIG. 4A is a diagram showing a case where lines are printed without compensating for line widths. Referring to FIG. 4A, an original image 410 includes a line A having a line width of 1 dot, a line B having a line width of 3 dots, and a line C having a line width of 2 dots. When the original image 410 is reduced by a reduction ratio of 50% and printed, the line A has a line width of 0.5 dot, the line B has a line width of 1.5 dots, and the line C has a line width of 1 dot in a reduced image 411. Since the image forming apparatus 1 may not print a line having a line width less than 1 dot, in an image 412 that is rendered by the rendering unit 110, the lines A, B, and C are rendered so that the line A has a line width of 0 dot, the line B has a line width of 2 dots, and the line C has a line width of 1 dot. In an image 413 that is reduced based on the rendered image 412, the line A is not printed, and the lines B and C are only printed.

Figure 4B:
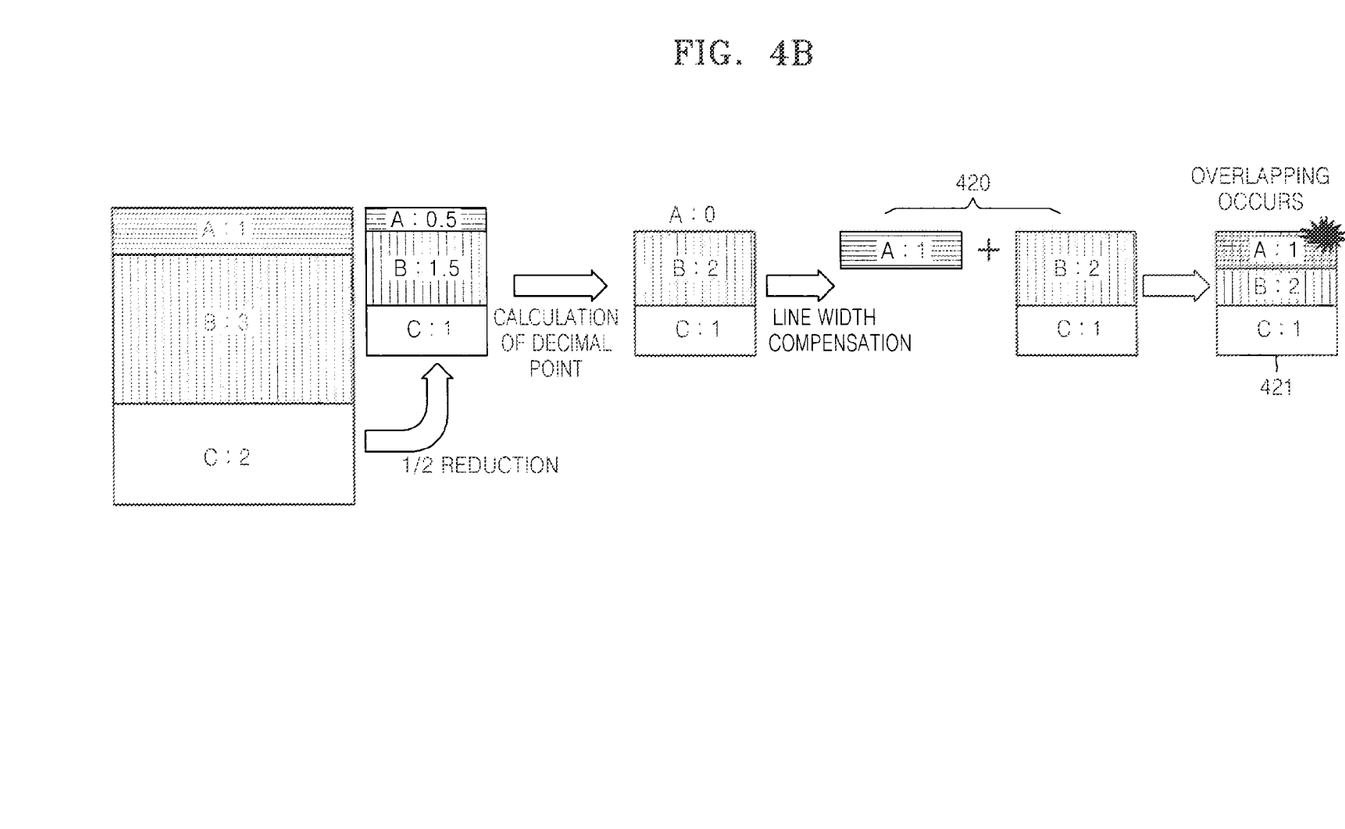
FIG. 4B is a diagram showing a case where lines are printed after compensating for a line thickness according to an embodiment of the present general inventive concept.

FIG. 4B is a diagram showing a case where lines are printed after compensating for line widths according to an embodiment of the present general inventive concept. Referring to FIG. 4B, an image 420, in which the line width of the line A is compensated to be 1 dot by the compensator 114, is shown. When the reduction printing operation is performed by reflecting the compensated line width of the line A, the line A and the line B overlap each other in a reduced image 421. If raster operator relations of the line A and the line B may overlap each other, printing quality of the line B is not affected; however, if the raster operator relations of the lines A and B may not overlap each other, the printing quality of line B may be degraded.

According to another embodiment of the present inventive concept, if image data includes a plurality of lines that may overlap each other due to compensation of line widths, the compensation determiner 113 determines the compensation based on a raster operator between the lines. The raster operator means an operating relation between a destination that is previously drawn, a source that is to be drawn, and a pattern, which is well known in the art, and thus, detailed descriptions are not provided here.

The compensation determiner 113 determines that line widths of non-overlappable lines are not compensated based on a raster operator. If the line widths of the non-overlappable lines are compensated, printing quality of lines corresponding to a background may degrade. The non-overlappable lines may not be printed so as not to overlap the lines corresponding to the background; however, when the line widths of the non-overlappable lines are compensated, the lines corresponding to the background are overlapped.

Moreover, the compensation determiner 113 determines that line widths of overlappable lines are compensated based on a raster operator. Unlike the non-overlappable lines, the overlappable lines that are printable on each other may be printed as overlapping a line corresponding to a background. Therefore, even when the line widths of the overlappable lines are compensated and the overlappable lines are printed as overlapping each other, printing quality of the line corresponding to the background is not degraded.

Figure 5A:
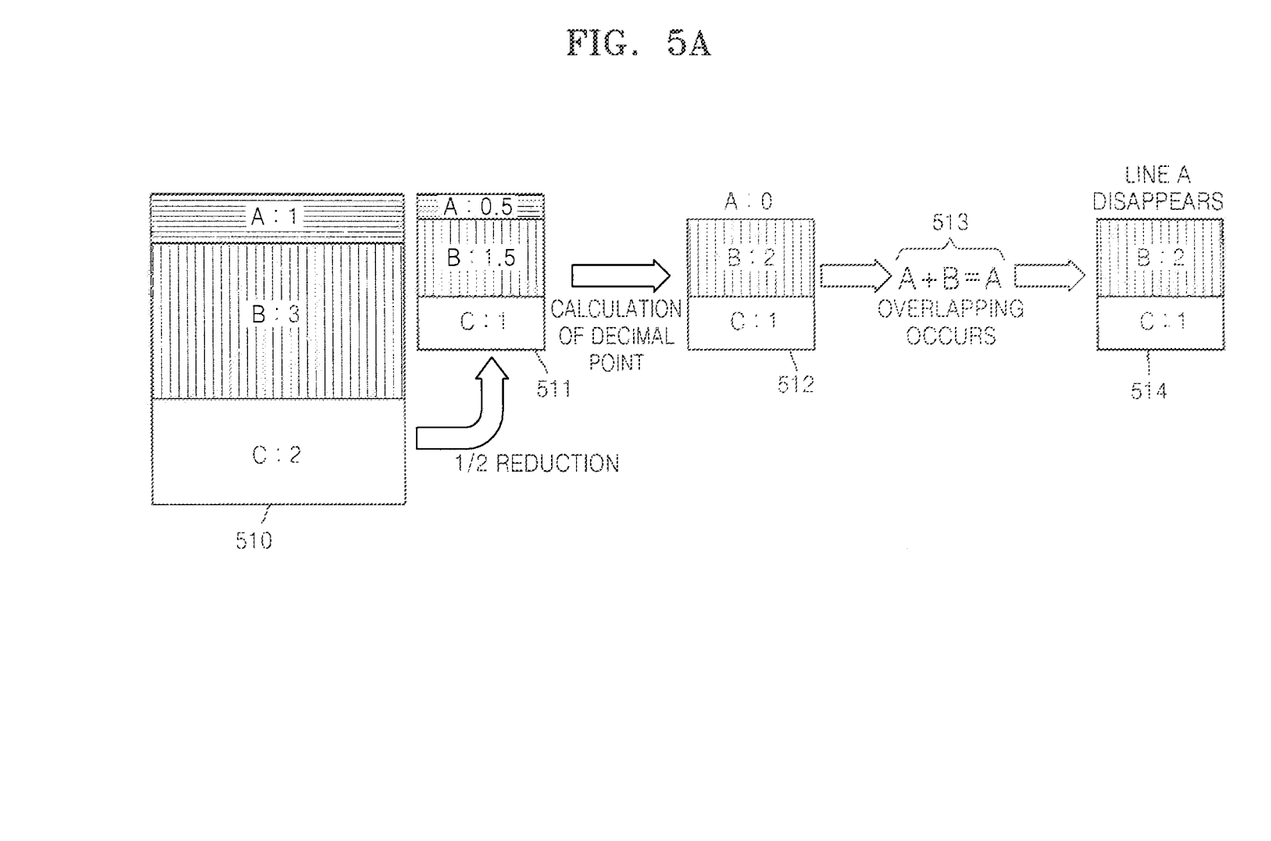
FIG. 5A is a diagram showing a case where a reduction printing operation is performed when there are non-overlappable lines according to another embodiment of the present general inventive concept.

FIG. 5A is a diagram showing a case where a reduction printing operation is performed when there are non-overlappable lines according to another embodiment of the present general inventive concept. Referring to FIG. 5A, an original image 510 includes a line A having a line width of 1 dot, a line B having a line width of 3 dots, and a C having a line width of 2 dots. When the original image 510 is reduced by a reduction ratio of 50% and printed, the line width of the line A is reduced to 0.5 dot, the line width of the line B is reduced to 1.5 dots, and the line width of the line C is reduced to 1 dot in a reduced image 511 according to the reduction ratio. Since the image forming apparatus 1 may not print a line having a line width less than 1 dot, the lines A, B, and C are rendered so that the line A has a line width of 0 dot, the line B has a line width of 2 dots, and the line C has a line width of 1 dot in an image 512 rendered by the rendering unit 110.

A diagram 513 denotes a case where a raster operator between a character A drawn by the line A and a character B drawn by the line B is an exclusive or (XOR) relation. If the compensator 114 compensates for the line width of the line A to be 1 dot, the line A and the line B may be printed as overlapping each other. However, when the characters A and B are printed as overlapping each other, it is hard to recognize both of the characters A and B as shown in the diagram 513, or in other words, only line A may be recognized, thereby degrading printing quality. Therefore, when one of the dines overlaps the other line, the line width of the non-overlappable line is not compensated. As shown in a reduced image 514, the line A is non-overlappable line, and thus, the line A is not printed.

Figure 5B:
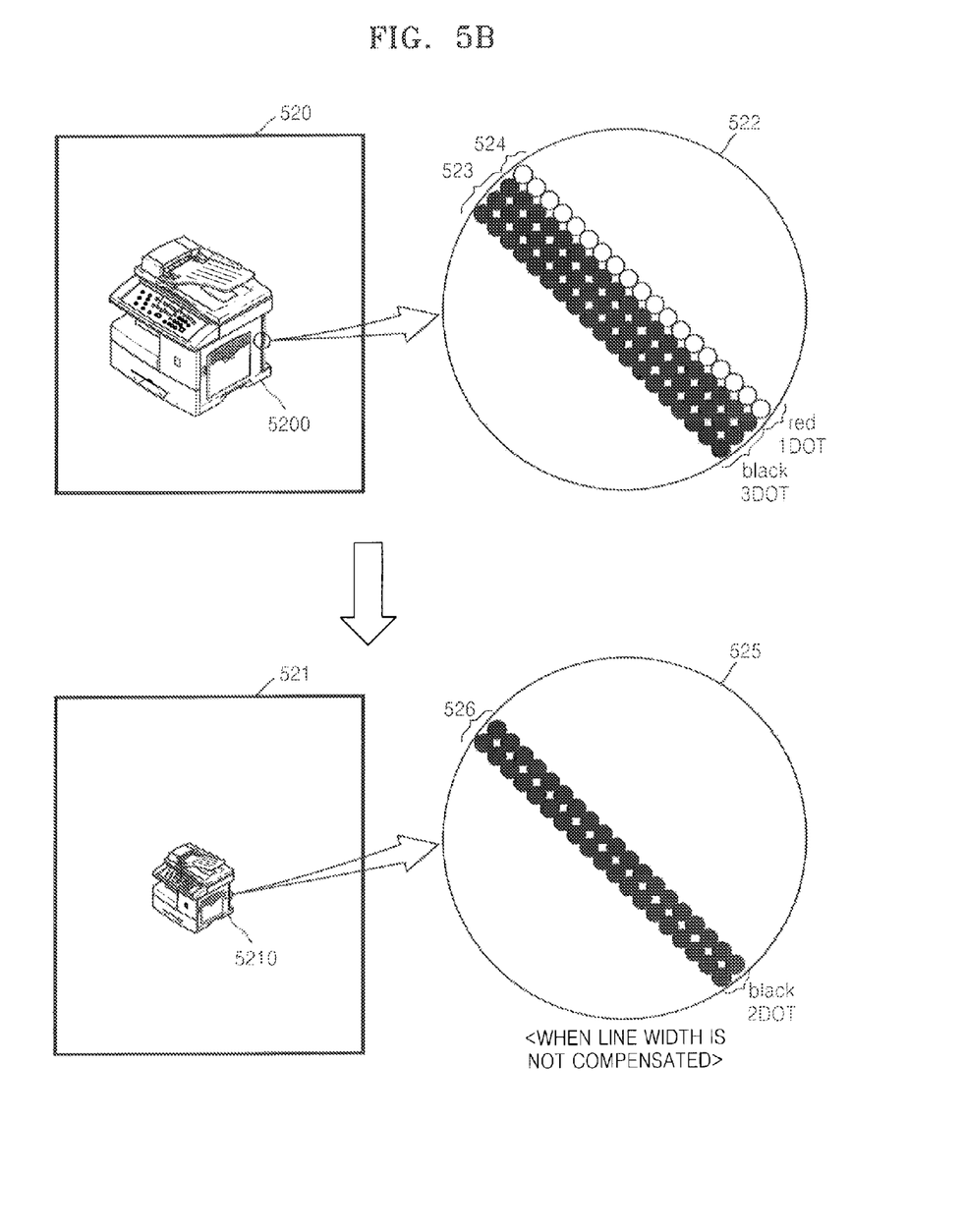
FIG. 5B is a diagram showing a case where the reduction printing operation is performed when non-overlappable lines exist, according to another embodiment of the present general inventive concept.

FIG. 5B is a diagram showing a case where the reduction printing operation is performed when non-overlappable lines exist, according to another embodiment of the present general inventive concept. Referring to FIG. 5B, an original image 520 includes a picture of a printer 5200, and a reduced image 521 includes a reduced picture of a printer 5210 that is reduced by a reduction ratio of 50%. In an enlarged view 522 enlarging a part of the picture of the printer 5200 in the original image 520, a black line 523 of 3 dots and a red line 524 of 1 dot are included in the part of the picture of the printer 5200. The black line 523 and the red line 524 show a raster operator relation representing that they are not printable as overlapping each other.

When the picture of the printer 5200 in the original image 520 is reduced by 50%, the black line 523 of 3 dots is reduced to have a line width of 2 dots and the red line 524 of 1 dot is reduced to have a line width of 0 dot. Therefore, as shown in an enlarged view 525 enlarging a part of the picture of the printer 5210 that is reduced in the reduced image 521, a black line 526 of 2 dots is only shown and the red line 524 of the original image 520 is not printed.

Figure 6A:
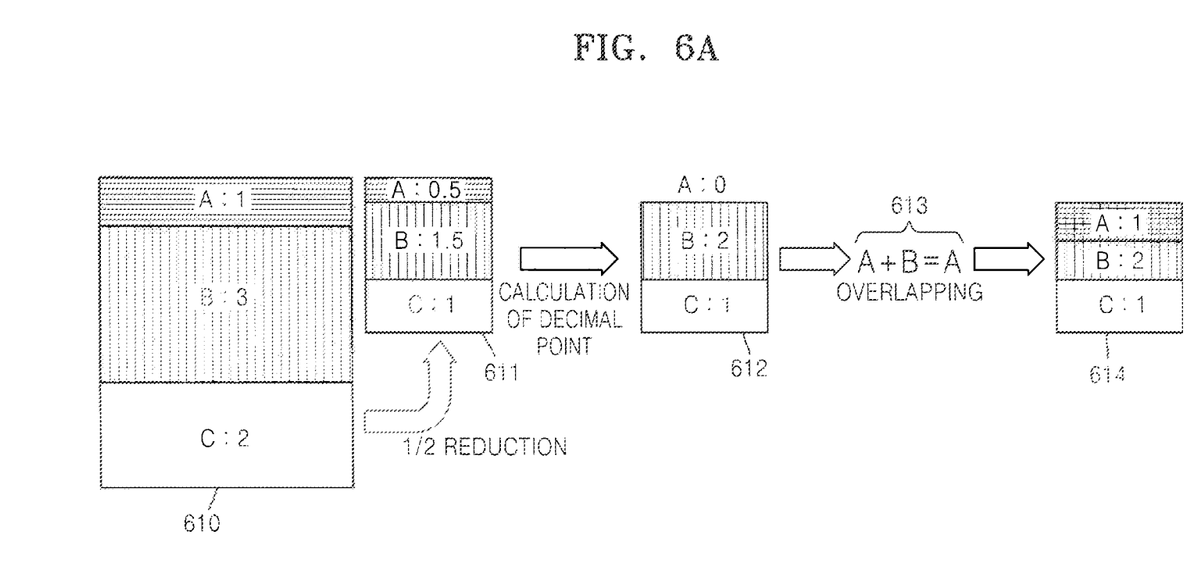
FIG. 6A is a diagram showing a process of performing a reduction printing operation when overlappable lines exist according to another embodiment of the present general inventive concept.

FIG. 6A is a diagram showing a process of performing a reduction printing operation when overlappable lines exist according to another embodiment of the present general inventive concept. Referring to FIG. 6A, an original image 610 includes a line A having a line width of 1 dot, a line B having a line width of 3 dots, and a line C having a line width of 2 dots. When the original image 610 is reduced by a reduction ratio of 50% and printed, a reduced image 611 that is reduced by the reduction ratio includes the line A having a line width of 0.5 dot, the line B having a line width of 1.5 dots, and the line C having a line width of 1 dot. Since the image forming apparatus 1 may not print a line having a line width less than 1 dot, the lines A, B, and C are rendered so that the line A has a line width of 0 dot, the line B has a line width of 2 dots, and the line C has a line width of 1 dot in an image 612 that is rendered by the rendering unit 110.

A diagram 613 represents that a raster operator relation between a character A drawn by the line A and a character B drawn by the line B denotes that the overlapping printing is possible. If the compensator 114 compensates for the line width of the line A to be 1 dot, the line A may be printed as overlapping the line B. However, as shown in the diagram 613, even though they overlap each other, the character A may ignore the character B and may be printed as overlapping the character B, and thus, the printing quality does not degrade. Therefore, when the overlap printing is possible, the line width is compensated. In a reduced image 614, the line A is printed as overlapping the line B.

Figure 6B:
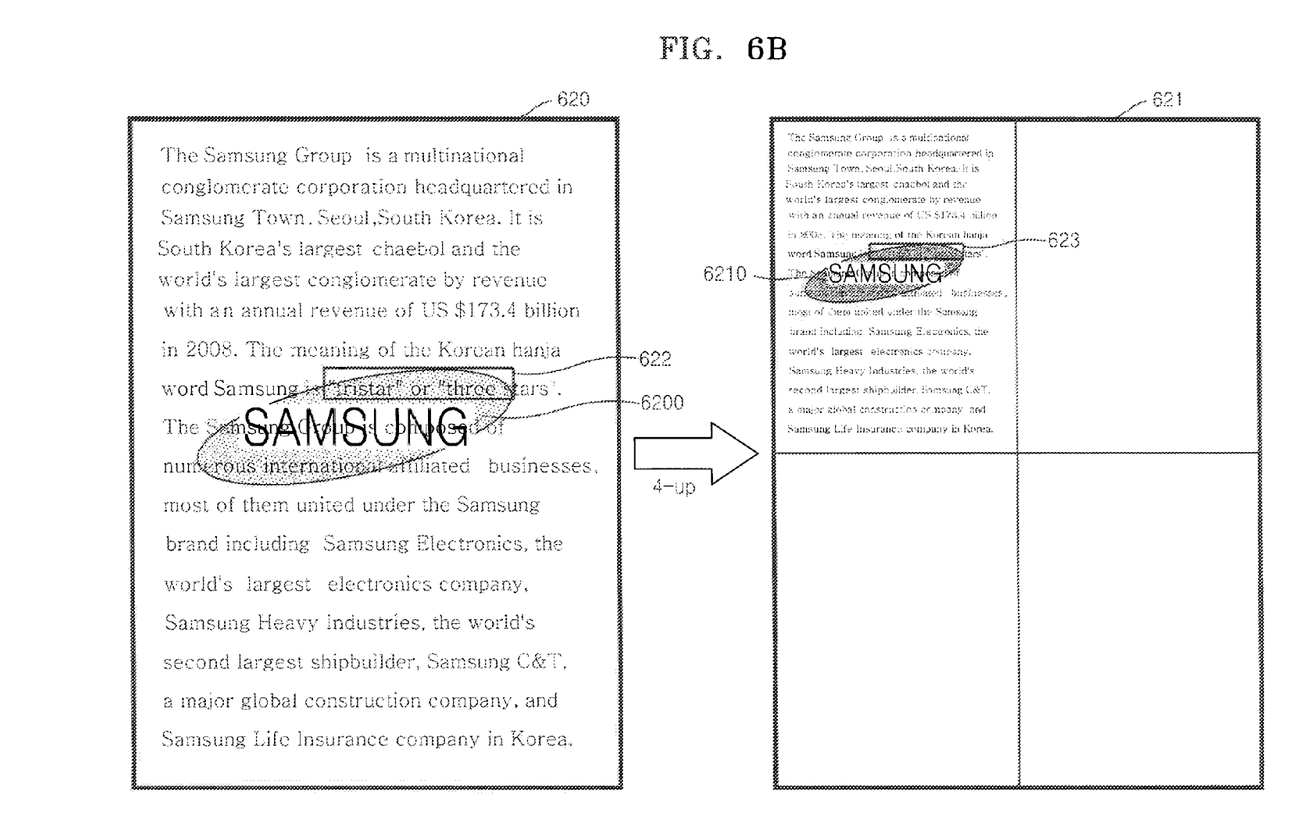
FIG. 6B is a diagram showing a case where overlappable lines are printed according to another embodiment of the present general inventive concept.

FIG. 6B is a diagram showing a case where overlappable lines are printed according to another embodiment of the present general inventive concept. Referring to FIG. 6B, an original image 620 is a document including a watermark 6200 on a center portion thereof, Characters 622 written on a portion overlapping the watermark 6200 have line widths of 1 dot. The characters 622 and the watermark 6200 may be printed as overlapping each other. That is, the characters 622 have a raster operator relation that allows the overlap printing with respect to the watermark 6200.

A reduced image 621 is reduced from the original image 620 according to a 4-up option in the N-up option. The characters 622 and the watermark 6200 of the original image 620 are reduced together according to the 4-up option. Here, the characters 622 have a line width less than 1 dot according to the 4-up option. However, as described above, reduced characters 623 have a raster operator relation that allows the overlap printing with respect to the watermark 6210. Therefore, the line widths of the characters 623 are compensated to be 1 dot. Consequently, in the reduced image 621, the characters 623 and the watermark 6210 may be printed together due to the compensation for the line widths.

Figure 7:
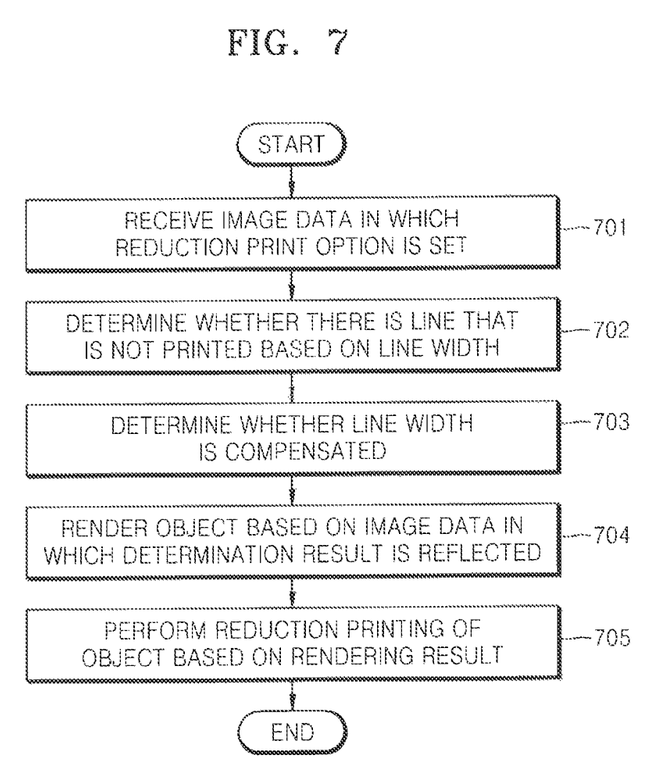
FIG. 7 is a flowchart illustrating a method of printing a reduced image in an image forming apparatus, according to an embodiment of the present general inventive concept.

The above-described embodiments are embodiments of the operation of the compensation determiner 113 shown in FIG. 1, and thus, operations of other components in the image forming apparatus 1 are the same as the previous embodiment of the present inventive concept FIG. 7 is a flowchart illustrating a method of printing a reduced image in an image forming apparatus, according to an embodiment of the present general inventive concept. Referring to FIG. 7, the method of printing the reduced image includes processes that are performed in a time-serial manner in the image forming apparatus 1 shown in FIG. 1. Therefore, the above-described contents about the image forming apparatus 1 shown in FIG. 1 are also applied to the method of printing the reduced image according to the present embodiment.

In operation 701, the network interface unit 10 receives image data, in which the reduction print option is set, from the host device.

In operation 702, the line determiner 112 determines whether at least one line that is not printable due to the reduction print option exists based on line widths of lines forming at least one object included in the image data, In operation 703, the compensation determiner 113 determines whether a line width of a line that is not printable is compensated when it is determined there is a line that is not printable.

In operation 704, the rendering unit 110 performs a rendering operation of the object based on the image data, in which a result of the determining whether the line width will be compensated is reflected.

In operation 705, the printing unit 12 performs the reduction printing operation by printing the object based on a rendering result.

Figure 8:
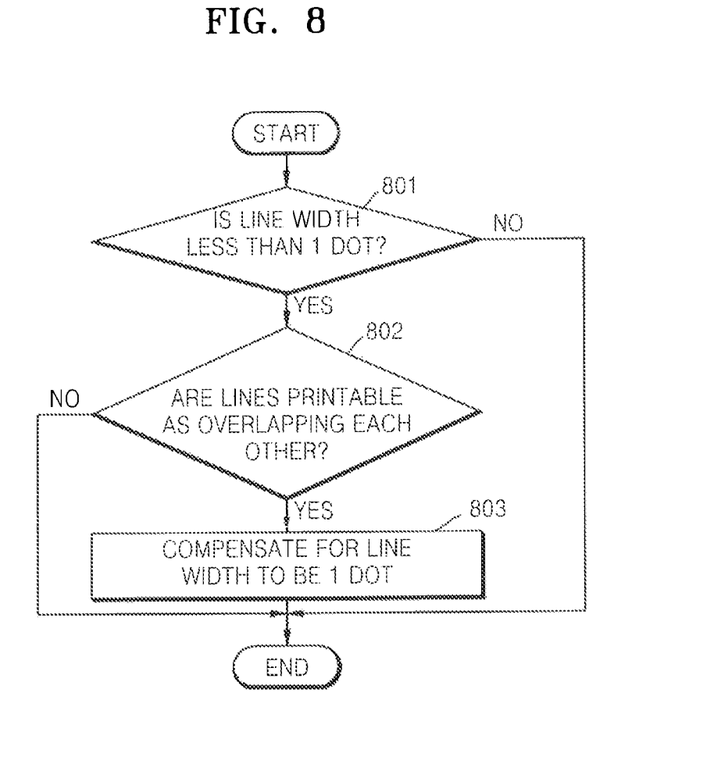
FIG. 8 is a flowchart illustrating a method of printing a reduced image in an image forming apparatus, according to another embodiment of the present general inventive concept.

FIG. 8 is a flowchart illustrating a method of printing a reduced image in an image forming apparatus, according to another embodiment of the present general inventive concept. Referring to FIG. 8, operations 702 and 703 of FIG. 7 are illustrated in detail, and other operations of FIG. 7 that are not shown in FIG. 8 are performed as in FIG. 7.

In operation 801, the line determiner 112 determines whether there is at least one line that is not printed due to the reduction print option based on line widths of lines forming at least one object included in image data The line determiner 112 determines that there is a line that is not printable when a line width of a line is less than the threshold value. Here, the threshold value may be set as the minimum line width that may be printable by the image forming apparatus 1, for example, 1 dot.

When a line width is less than 1 dot, the process goes to operation 802 in order to determine whether the line width will be compensated, and when the line width is 1 dot or greater, the processes of FIG. 8 are finished since the line width is not compensated.

In operation 802, the compensation determiner 113 determines whether lines widths are compensated based on a raster operator between the lines, when the image data includes a plurality of lines that will be printed as overlapping each other due to compensation of line widths. The compensation determiner 113 determines that line widths of non-overlappable lines are not compensated based on raster operator relations, and the processes of FIG. 8 are finished. However, if the compensation determiner 113 determines that line widths of overlappable lines are compensated, processes go to operation 803.

In operation 803, the compensator 114 compensates for a line width of a line that is not printed by a value that is printable in the image forming apparatus, if it is determined that the line width is compensated. Here, the value printable by the image forming apparatus 1 may be 1 dot.

After finishing the processes of FIG. 8, operation 704 of FIG. 7 is performed.

According to the above description, when the user performs the reduction printing operation of the image data by using the image forming apparatus, the line widths of the lines forming the object, which may disappear due to the reduction printing operation, are compensated so that the reduced image may be printed as the original image. Therefore, the image desired by the user may be reduced and printed without the lines disappearing due to the reduction. Therefore, the printing quality of the reduction printing may be maintained to be equal to that of the original image.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A method of performing reduction printing in an image forming apparatus, the method comprising:
- receiving image data, in which a reduction print option is set, from a host device connected to the image forming apparatus;
- determining whether there is at least one unprintable line in the image data due to the reduction print option based on line widths of lines forming at least one object included in the image data;
- when it is determined that there is at least one unprintable line in the image data due to the reduction print option, determining whether a line width of the at least one unprintable line in the image data will be compensated;
- rendering the object based on the image data, in which a result of the determining of whether the line width of the at least one unprintable line in the image data will be compensated is reflected; and
- performing a reduction printing operation by printing the object based on a rendering result.

2. The method of claim 1, wherein, in the determining of whether there is at least one unprintable line, it is determined that there is an unprintable line when there is a line width less than a threshold value.

3. The method of claim 2, wherein the threshold value is 1 dot.

4. The method of claim 1, further comprising compensating for the line width of the unprintable line to be a value that is printable by the image forming apparatus, when it is determined that the line width of the unprintable line will be compensated,
- wherein, in the rendering of the object, the object is rendered based on the compensated line width.

5. The method of claim 1, wherein the value that is printable is 1 dot.

6. The method of claim 1, further comprising calculating a line width of a line that will be reduced by a reduction ratio set in the reduction print option,
- wherein the determining of whether there is at least one unprintable line is performed based on the calculated line width.

7. The method of claim 1, wherein the determining of compensation is performed based on a raster operator between lines, when the image data includes a plurality of lines that will be printed as overlapping each other due to compensation of line widths.

8. The method of claim 7, wherein, in the determining of compensation, it is determined that line widths of non-overlappable lines are not compensated based on the raster operator.

9. The method of claim 7, wherein it is determined that line widths of overlappable lines are compensated based on the raster operator.

10. The method of claim 1, wherein the reduction print option is at least one of an option for reducing a plurality of pages on one printing medium, and an option for reducing one page on one printing medium by a predetermined reduction ratio.

11. A non-transitory computer readable recording medium having embodied thereon a computer program for executing a method, the method comprising:
- receiving image data, in which a reduction print option is set, from a host device connected to the image forming apparatus;
- determining whether there is at least one unprintable line in the image data due to the reduction print option based on line widths of lines forming at least one object included in the image data;
- when it is determined that there is at least one unprintable line in the image data due to the reduction print option, determining whether a line width of the at least one unprintable line in the image data will be compensated;
- rendering the object based on the image data, in which a result of the determining of whether the line width of the at least one unprintable line in the image data will be compensated is reflected; and
- performing a reduction printing operation by printing the object based on a rendering result.

12. An image forming apparatus comprising:
- a network interface unit to receive image data, in which a reduction print option is set, from a host device;
- a line determiner to determine whether there is at least one unprintable line in the image data due to the reduction print option based on line widths of lines forming at least one object included in the image data;
- a compensation determiner to determine whether a line width of the at least one unprintable line in the image data will be compensated when it is determined that there is at least one unprintable line in the image data due to the reduction print option;
- a rendering unit to render the object based on the image data in which a result of the compensation determiner is reflected; and
- a printing unit to perform a reduction printing by printing the object based on a rendering result.

13. The image forming apparatus of claim 12, wherein the line determiner determines that there is an unprintable line when there is a line width less than a threshold value.

14. The image forming apparatus of claim 13, wherein the threshold value is 1 dot.

15. The image forming apparatus of claim 12, further comprising a compensator to compensate for the line width of the unprintable line to be a printable value in the image forming apparatus when it is determined that the line width of the unprintable line will be compensated,
- wherein the rendering unit performs the rendering of the object based on the compensated line width.

16. The image forming apparatus of claim 15, wherein the value that is printable is 1 dot.

17. The image forming apparatus of claim 12, further comprising a calculator to calculate a line width of a line that will be reduced according to a reduction ratio set in the reduction print option,
- wherein the line determiner performs the determining based on the calculated line width.

18. The image forming apparatus of claim 12, wherein the compensation determiner determines the compensation based on a raster operator between lines, when the image data includes a plurality of lines that will be printed as overlapping each other due to compensation of line widths.

19. The image forming apparatus of claim 18, wherein the compensation determiner determines that line widths of non-overlappable lines are not compensated based on the raster operator.

20. The image forming apparatus of claim 18, wherein the compensation determiner determines that line widths of overlappable lines are compensated based on the raster operator.

21. The image forming apparatus of claim 12, wherein the rendering unit renders the object according to a reduction ratio, and renders the at least one unprintable line according to a different reduction ratio.

* * * * *